Nov. 14, 1967     F. W. WOODHOUSE ETAL     3,352,469
AUTOMATIC LOOP-FORMING AND THREADING MECHANISM
Filed April 19, 1962     2 Sheets-Sheet 1

FRED W. WOODHOUSE
WILLIAM S. OWEN, JR.
INVENTORS

BY

ATTORNEYS

Nov. 14, 1967  F. W. WOODHOUSE ETAL  3,352,469
AUTOMATIC LOOP-FORMING AND THREADING MECHANISM
Filed April 19, 1962  2 Sheets-Sheet 2
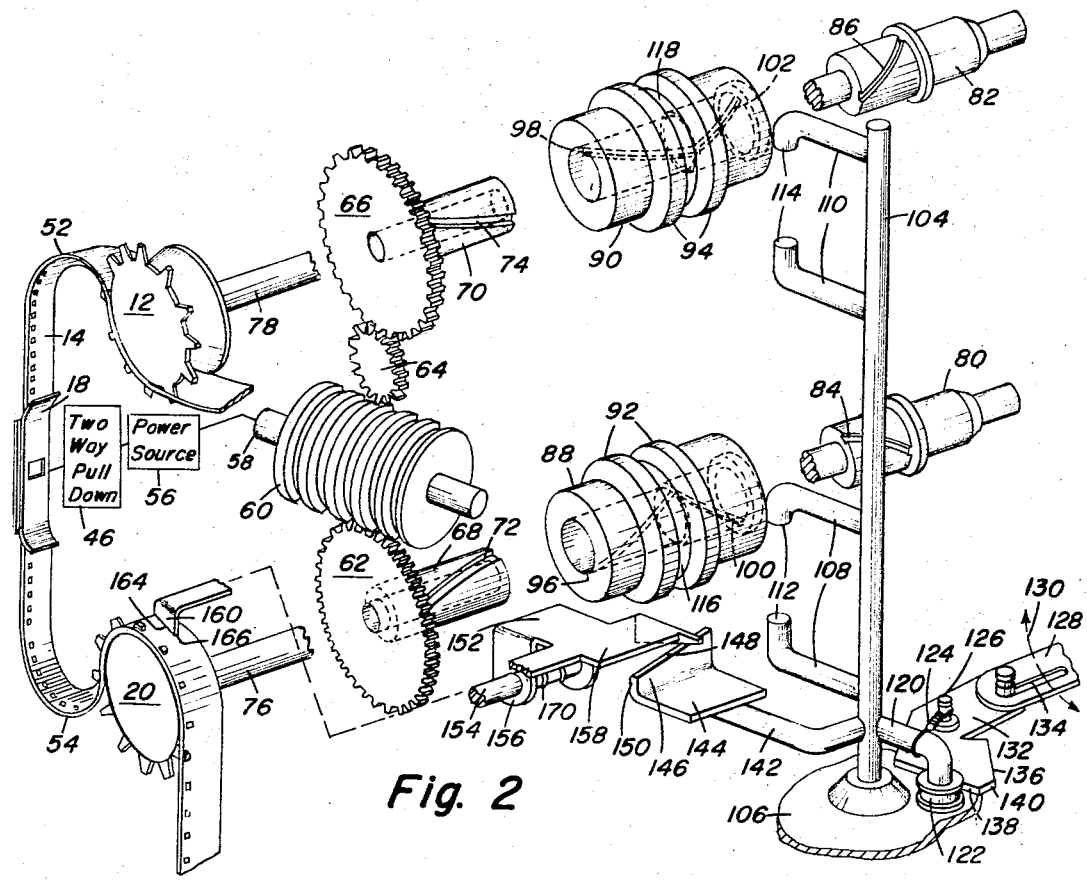
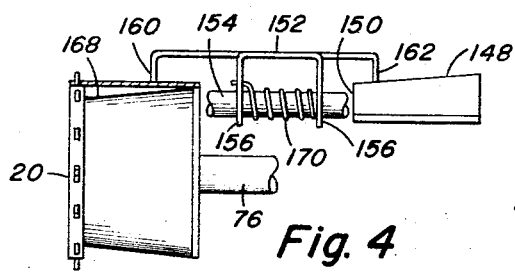
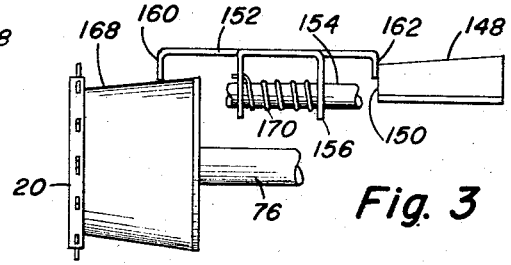
FRED W. WOODHOUSE
WILLIAM S. OWEN, JR.
INVENTORS
BY
ATTORNEYS

United States Patent Office 3,352,469
Patented Nov. 14, 1967

3,352,469
AUTOMATIC LOOP-FORMING AND
THREADING MECHANISM
Fred W. Woodhouse and William S. Owen, Jr., Rochester, N.Y., assignors to Eastman Kodak Company, Rochester, N.Y., a corporation of New Jersey
Filed Apr. 19, 1962, Ser. No. 188,770
4 Claims. (Cl. 226—91)

The present invention relates to a motion picture projector and more particularly to an automatic loop-adjusting mechanism for a motion picture projector. This invention has advantage in any type of motion picture projector employing film loops, and has particular advantage in those utilizing automatic threading.

Generally, motion picture projectors having automatic threading now being manufactured require that a filmstrip be manually inserted into a film entrance slot after which a supply sprocket drives the filmstrip through an upper loop guide, film gate, lower loop guide, and to the take-up sprocket of the projector, in that sequence. Various triggering mechanisms are positioned in the path of the filmstrip for actuating mechanisms which pivot the upper loop guide and the lower loop guide, to a film disengaging position. Accordingly, by pivoting each of the loop guides, the inner guiding surface of each of the respective loop guides is displaced an accurate distance from the threading position such that the moving surface of the filmstrip will not engage or rub on the guiding surface of the loop guides. In the event that the perforations in the film are stripped, the continued operation of the projector can result in loss of loop in the filmstrip which loss greatly increases the tension on the filmstrip, thereby tending to stress both the filmstrip, as well as the movable mechanical projector.

The present invention incorporates a structure which overcomes these difficulties by automatically forming loops of the desired size in the filmstrip whenever the projector is placed in an operative condition. In projectors with automatic threading, this permits the loop formers to be secured in a fixed position, in that after the filmstrip is threaded through the gate and onto the take-up sprocket that portion of the filmstrip forming each of the loops is automatically reduced in length to thereby decrease the radius of curvature of the loops and displace the moving surface of the film from the fixed surface of the loop formers, rather than moving the loop formers clear of the loops.

It is a principal object of this invention to provide an improved automatic loop-forming or loop-adjusting mechanism for motion picture apparatus.

A further object of this invention is to provide such automatic mechanism in which one or more of the film sprockets is rotationally displaced independently of its drive shaft to form or adjust the size of a loop in the film.

Another object of this invention is the provision of loop-forming or adjusting means for automatic threading projectors, which permits the use of stationary guide members in the loop area.

Still another object of this invention is to provide a threading mechanism which senses the presence of the threaded film and automatically adjusts the loop size in the film of the motion picture apparatus.

Another object of this invention is to provide an automatic loop-forming or adjusting mechanism which provides proper loops even though a portion of the filmstrip is lacking in perforations.

The foregoing and other objects and a fuller understanding of the invention can be had by referring to the following description and claims taken in conjunction with the accompanying drawings in which:

FIG. 2 is an exploded perspective view showing the operating mechanism of the loop-adjusting mechanism for the projector of FIG. 1;

FIG. 3 is a front view of the triggering mechanism cooperating with the lower sprocket prior to engagement of a filmstrip with that sprocket;

FIG. 4 is a view similar to FIG. 3 but showing the motion picture film in an operative relation to the lower sprocket;

In order to better understand the operation and construction of the mechanism, a brief summary of the apparatus and its operation will be helpful. In general two spaced film advancing sprockets driven in synchronism successively engage and propel a strip of film from a supply through a gate to a takeup. Guides thread the film through a curved path intermediate the spaced film advancing sprockets. Once the filmstrip is threaded, the length of film between the two spaced film advancing sprockets is altered by a mechanism which changes the rate of operation of at least one of the film advancing sprockets relative to the other to change the length of film between the advancing sprockets whereby the film is displaced out of contact with the guides.

Figure 1:
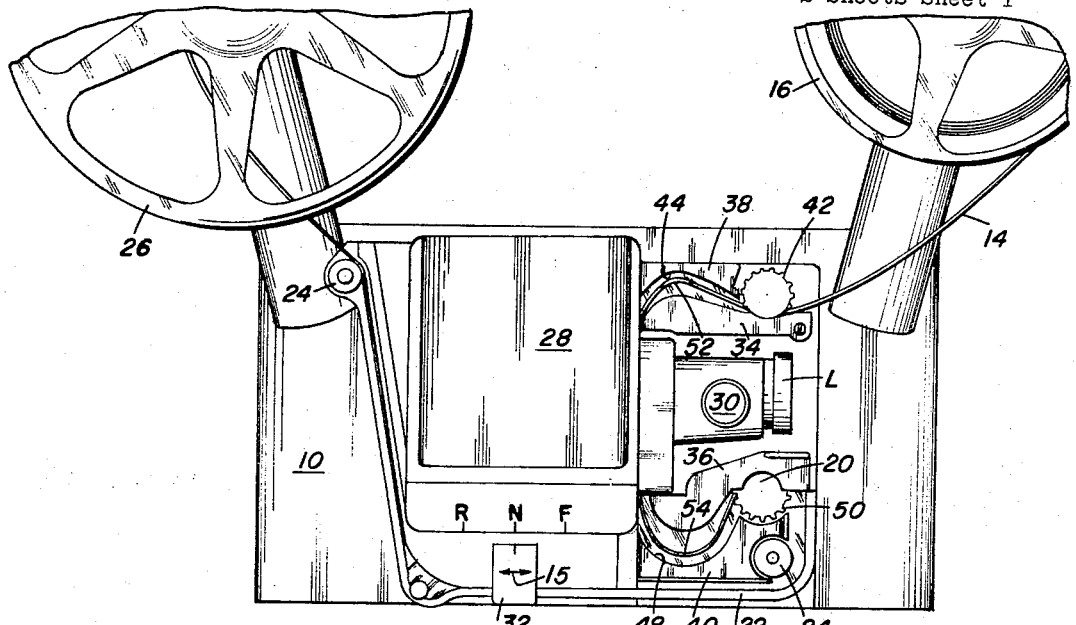
FIG. 1 is the side elevation view of the motion picture projector incorporating the mechanism in accordance with the preferred embodiment of the present invention.

To proceed now with a detailed description of the apparatus as shown in a preferred embodiment of the drawings, the loop-forming and automatic threading system of this invention will be described with particular reference to a motion picture projector. As best shown in FIG. 1, wherein reference numeral 10 designates the housing of the projector, a film feeding supply sprocket 12, located adjacent to the film entrance of the projector, propels a filmstrip 14 from a supply reel 16, through the usual film gate 18, as best shown in FIG. 2, to a take-up film feed sprocket 20. A channel-shaped threading guide 22, guides filmstrip 14 over idler guide rolls 24 to a take-up reel 26. The image frame of the filmstrip 14 contained in film gate 18, is illuminated by a projection lamp enclosed within lamp housing 28 for projection through lens system L and onto a screen (not shown). A knob 30 suitably connected to a lens system L focuses the projected image upon the screen.

The drive for the projector mechanism is such as to provide forward (F), reverse (R), and/or still or neutral (N) operation as is well known. To this end a control handle 32 is provided to swing on a vertical axis relative to the base of housing 10 in the direction shown by the double ended arrow 15 from the neutral position N to either the forward position F or the reverse position R. In moving between these positions control handle 32 operates suitable shifting mechanism to alter the direction of drive, or stop the drive, of the film-feeding members as is well known in the art and hence is not shown. In connection with the present invention it is important to note that in moving between forward and reverse drive conditions the mechanism passes through the neutral position.

The self-threading feature of the projector incorporates cooperating sprocket clamps 34 and 36 and stationary loop guides 38 and 40, respectively. When filmstrip 14 is inserted into the entranceway formed between the leading side of feed sprocket 12 and its associated clamp 34, sprocket clamp 34 will hold the perforations of filmstrip 14 in engagement with the teeth 42 of supply sprocket 12. As filmstrip 14 exits from between cooperating sprocket clamp 34 and supply sprocket 12, it engages and follows the stationary curved surface 44 of upper loop guide 38 so that filmstrip 14 is directed into film gate 18 for engagement by the two-way pulldown mechanism, shown in FIG. 2 as a box since it may be of known and conventional design. Filmstrip 14 then passes through the film gate 18 and engages the stationary curved surface 48 of lower loop guide 40, which surface redirects filmstrip 14 into engagement with the teeth 50 of take-up sprocket 20. A portion of lower sprocket clamp 36 embraces take-up sprocket 20 to hold the perforations of filmstrip 14 on the teeth of the sprocket and to redirect filmstrip 14 downwardly into threading guide 22.

By the mechanism hereinbelow more particularly described the radius of curvature of each of the loops formed in the filmstrip 14 by the upper and lower loop guides 38 and 40 respectively, is changed so that the proper operational free loops 52 and 54 are formed in filmstrip 14 before and beyond film gate 18 to permit the proper functions of the two-way pulldown mechanism 46 in a well known manner.

The mechanism for reducing the size of the loops to free them from engagement with stationary loop guides 38 and 40 is shown in FIG. 2 wherein filmstrip 14 is shown in threaded position relative to supply sprocket 12, film gate 18, and take-up sprocket 20.

A power source 56 supplies substantially constant speed and constant torque power input in the forward and reverse directions to both the two-way pulldown mechanism 46 and a shaft 58. Shaft 58 rotates in timed relation with a shutter (not shown) and can conveniently be the shutter suporting shaft. A worm gear 60 is secured to shaft 58 to rotate therewith. A spur gear 62 which meshes with worm gear 60 is disposed below worm gear 60 and is adapted to transmit rotational power from worm gear 60 in a direction substantially transverse to shaft 58. A pinion gear 64 disposed above and meshing with worm gear 60 transmits power from worm gear 60 to a second spur gear 66 disposed above pinion gear 64. Pinion gear 64 neither reduces nor increases the gear ratio between worm gear 60 and spur gear 66, whereby both spur gear 62 and spur gear 66 rotate in the same direction and at the same synchronous speed. Spur gears 62 and 66 are provided with hubs 68 and 70, respectively, which extend axially in the same direction and are substantially parallel to one another. Each of hubs 68 and 70 are provided with a plurality of helical grooves 72 and 74, only one being shown on each hub, which extend substantially the entire length of each of the respective hubs 68 and 70. The helical grooves 74 in hub 70 are formed in an opposite sense to the helical grooves 72 in hub 68.

Rotatable sprocket shafts 76 and 78, which are spaced substantially parallel to each other, pass through and are concentric with hubs 68 and 70, respectively, as well as being coaxial with spur gears 62 and 66, respectively. Sprockets 20 and 12 are secured to a free end of each of sprocket shafts 76 and 78, respectively, and are disposed substantially in vertical alignment to each other in a common plane, which plane is substantially perpendicular to the axis of sprocket shafts 76 and 78 and which also includes the normal path of the film through film gate 18. A pair of male members 80 and 82 are secured to the opposite free ends of sprocket shafts 76 and 78, respectively. A plurality of helical grooves 84 and 86, only one of each being shown, are formed on male members 80 and 82, respectively, in an opposite sense relative to each other and also in an opposite sense relative to the respective grooves 72 and 74, respectively, on hubs 68 and 70.

Male member 82 is connected to hub 70 by a tubular coupling 90 which slidably engages each of these parts, while male member 80 is connected to hub member 68 by a like tubular coupling 88 which slidably engages each of these parts. A pair of spaced parallel radial collars 92 and 94 are formed on the outer periphery of coupling members 88 and 90, respectively.

A plurality of helical splines 96 and 98, only one of each being shown, are formed in an opposite sense to each other on the inner surface of hollow coupling members 88 and 90, respectively, and extend substantially half the length of their respective coupling members. The pitch and number of helical splines 96 and 98 is identical to the pitch and number of helical grooves 72 and 74, respecitvely. A second plurality of helical splines 100 and 102, only one of each being shown, are also formed in an opposite sense both to each other and to their adjacent helical splines 96 and 98, respectively, on the remaining half of the inner surface of tubular coupling members 88 and 90. The pitch and number of helical splines 100 and 102 is identical to the pitch and number of helical grooves 84 and 86, respectively. Hence, as coupling members 88 and 90 are disposed intermediate hubs 68 and 70, respectively, and male members 80 and 82, the coupling members 88 and 90 transmit rotational movement of spur gears 62 and 66 to sprockets 12 and 20. In addition, coupling members 88 and 90 can be displaced axially in the same direction relative to both hubs 68 and 70, respectively, and male members 80 and 82, respectively, to angularly displace sprockets 12 and 20 in an equal but opposite arcuate direction.

A vertically disposed rotatable shifting shaft 104 is journaled intermediate the top (not shown) and bottom wall 106 of housing 10. Two pairs of L-shaped arm members 108 and 110, respectively, are secured to shifting shaft 104 and extend radially in the same direction from the axis of rotation of shifting shaft 104. L-shaped arm members 108 and 110 of each pair are spaced a distance such that the respective remote ends 112 and 114 of arms 108 and 110 will cooperate with circumferential grooves 116 and 118 formed intermediate the two parts of collars 92 and 94 of coupling members 88 and 90, respectively.

Another L-shaped arm member 120, which has a cam follower 122 at its remote depending end, is secured to shifting shaft 104 adjacent the end journaled in the bottom wall 106. A spring member 124 having one end secured adjacent to the depending end of arm member 120 and the other end secured to a pin 126 biases shifting shaft 104 in a counterclockwise direction about its axis. Control level 128 which is connected to control handle 32, as shown in FIG. 1, by suitable linkage, not shown, is rotated about an axis parallel to that of shaft 104 as indicated by double-ended arrow 130. A cam 132 pivoted about pin 126 projecting from wall 106 is connected to control lever 128 by a pin-and-slot connection 134. Cam 132 has cam surfaces 136, 138 and 140 formed thereon which surfaces are adapted to cooperate with cam follower 122. Cam surface 140, which corresponds to the neutral position N and which is located farthest from the axis of rotation of cam 132 and intermediate cam surfaces 136 and 138, will engage cam follower 122 to rotate shifting shaft 104 relative to wall 106 for a maximum clockwise displacement against the bias of spring 124. Hence, when control lever 32 is swung from F to N or R to N, cam 132 will be rotated about pin 126 and surface 140 will engage cam follower 122 and tend to displace shifting shaft 104 for maximum clockwise displacement.

Another L-shaped arm member 142 is secured to shifting shaft 104 adjacent arm 120 and extends radially therefrom for rotational displacement about the axis of shaft 104 without interfering with the operation of any of the elements described hereinabove. An L-shaped plate 144 is secured to the remote end of arm member 142 and has a base-like portion 146 which extends upwardly substantially in a plane parallel to the axis of shifting shaft 104. The uppermost edge 148 of base portion 146 is canted relative to the intersection of the legs comprising L-shaped plate 144. A side portion 150 of base portion 146 extends substantially parallel to the axis of shaft 104 in a vertical direction.

As best shown in FIGS. 2, 3 and 4, a combined latch-and-trigger member 152 is pivoted adjacent to take-up sprocket 20 on a support rod 154, which rod is disposed substantially parallel to sprocket shaft 76. A pair of depending ears 156 pivotally support the combined latch-and-trigger member 152 on support rod 154. An elongated portion 158 offset from the pivotal axis of ears 156 has formed on opposite ends downwardly depending members 160 and 162, which members lie in substantially parallel planes which are transverse to the axis of support rod 154. Depending member 160 is a film-sensing member and has a sloping edge 164, forming a tip 166 which cooperates with the surface of beveled hub member 168 of take-up sprocket 20. Depending member 162, which is a latch member, cooperates with the side edge 150 and canted edge 148 of L-shaped plate 144 in a manner more fully hereinbelow described. Combined latch-and-trigger member 152 is biased in a clockwise direction as viewed in FIG. 2 about rod 154 by coil spring 170 to urge film-sensing member 160 into engagement with hub member 168 of take-up sprocket 20.

In order to more fully understand the operation of the loop-adjusting mechanism, it will be helpful to describe the threading operation and running condition of the projector in the neutral, forward and reverse directions.

In the neutral or stop position when there is no film threaded through the projector, control handle 32 pivots cam 132 to a position such that cam surface 140 engages and displaces cam follower 122 clockwise about the axis of shaft 104 against the counterclockwise tension force exerted by spring 124. Hence, combined trigger-and-latch member 152 which is normally urged in a clockwise direction by spring 170 about rod 154 is allowed to pivot in a clockwise direction about the axis of rod 154 so that depending member 160 engages the tapered surface of beveled hub 168 of take-up sprocket 20, see FIG. 3. The side edge 150 of base leg member 146 of L-shaped plate 144 then is placed adjacent to the outer surface of depending member 162 so that shifting shaft 104 is prevented from moving in a counterclockwise direction under the action of spring 124 even when cam 132 is pivoted out of the neutral (N) position as would be the case in the forward (F) or reverse (R) position of control handle 32.

Prior to threading, and while the control handle 32 is in the neutral (N) position, the operator mounts the supply reel 16 on the projector in the position shown in FIG. 1 and then places the leader end of the filmstrip 14 into the entrance slot formed between the supply sprocket 12 and its cooperating sprocket clamp 34. Control handle 32 is moved to the forward position whereby cam 132 shown in FIG. 2 is pivoted out of engagement with cam follower 122. Electrical contacts, not shown, are closed and mechanical power from the power source 56 actuates the two-way pulldown claw mechanism 46 of the film gate 18 and simultaneously rotates shaft 58, as best shown in FIG. 2. As worm gear 60 is rotated, power is supplied to pinion gear 64, spur gear 66, coupling 90, male member 82 and supply sprocket shaft 78 to rotate supply sprocket 12 in a clockwise direction. Likewise, power is supplied to spur gear 62, coupling 88, male member 80 and take-up sprocket 20. Filmstrip 14 passes from supply sprocket 12 into engagement with curved surface 44 of stationary loop guide 38. The leader end of filmstrip 14 is thence directed into the entrance of film gate 18 wherein the intermittent two-way pull-down claw mechanism 46 engages the perforations of filmstrip 14 to intermittently feed filmstrip through film gate 18. As the filmstrip exits from film gate 18, the leader end of filmstrip 14 engages the curved surface 48 of lower stationary loop guide 40 which redirects the filmstrip upwardly into cooperative engagement with take-up sprocket 20 and sprocket clamp 36. As filmstrip 14 threadedly engages sprocket 20, it is to be especially noted that the loops formed in filmstrip 14 intermediate supply sprocket 12 and film gate 18; and, film gate 18 and take-up sprocket 20, engage the curved inner surfaces 44 and 48 of stationary loop guides 38 and 40, respectively. Due to the constant-speed rotation of supply sprocket 12 and take-up sprocket 20, the filmstrip would normally lie substantially flush with the inner curved surfaces 44 and 48 of the stationary loop guides 38 and 40. However, as intermittent motion is imparted to filmstrip 14 by the two-way claw mechanism 46 of film gate 18, the distance of the filmstrip 14 between supply sprocket 12 and the film gate 18; as well as the distance of filmstrip 14 between the film gate 18 and take-up sprocket 20 intermittently varies slightly thus tending to slap substantially the entire length of filmstrip engaging the stationary guides 38 and 40 against these same stationary guides.

This condition is alleviated by the loop-adjusting mechanism best shown in FIGS. 2 through 6. As filmstrip 14 is initially threaded to take-up sprocket 20, the plane of filmstrip 14 is spaced from beveled hub 168 of take-up sprocket 20. At this instant, filmstrip 14 is threaded through the projector and is in cooperative engagement with supply sprocket 12, curved surface 44 of stationary guide 38, film gate 18, curved surface 48 of stationary guide 40 and take-up sprocket 20. As take-up sprocket 20 continues to rotate, the leader end of filmstrip 14 is nipped between the sloping surface 164 of depending member 160 and the surface of beveled hub member 168 as it passes over take-up sprocket 20. The rigidity of filmstrip 14 is sufficient to pivot trigger and latch member 152 in a counterclockwise direction about rod 154 whereby tip 166 rides on the upper surface of filmstrip 14 as it passes over sprocket 20.

Figure 6:
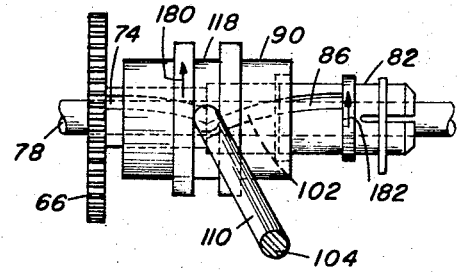
FIG. 6 is a view similar to FIG. 5 but showing the position of the coupling drive after the formation of the free loop.
Figure 5:
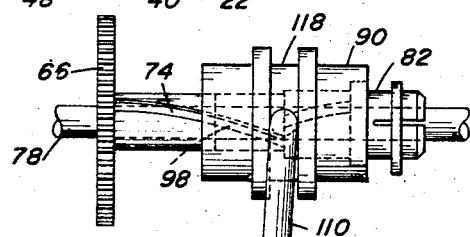
FIG. 5 is a top plan view of the coupling drive of the loop-forming mechanism associated with the upper film sprocket prior to formation of the free loop.

As best shown in FIG. 4, contemporaneous with the upward movement of depending member 160 about rod 154, depending member 162 is also displaced upwardly so that depending member 162 no longer intercepts side edge 150 of L-shaped plate 144. The tension force of spring 124 as shown in FIG. 2 will thence tend to rotate shifting shaft 104 in a counterclockwise direction which will correspondingly displace arm members 108 and 110 in a counterclockwise direction about the axis of shifting shaft 104, as viewed in FIG. 2. The remote ends 112 and 114 of arms 108 and 110, respectively, will, due to their cooperation with grooves 116 and 118, displace coupling members 88 and 90 axially of hub members 68 and 70 in the direction of sprockets 12 and 20. Spur gears 62 and 66 are in mesh with and are being continuously rotated by worm gear 60, so that any axial displacement of coupling members 88 and 90 will not transmit any arcuate movement back to spur gears 62 and 66 because of the threaded spline and groove connection therebetween. Hence, axial displacement of coupling members 88 and 90, will reflect only in an arcuate displacement of male members 80 and 82 relative to the respective hubs 68 and 70 of spur gears 62 and 66. This arcuate displacement is best shown in FIGS. 5 and 6 in which only the mechanism for the supply sprocket 12 is described. In FIG. 5, shifting shaft 104 and arm 110 are in the position they would assume when control handle 32 is in the neutral position. In this position, coupling member 90 is located intermediate spur gear 66 and male member 82 and transmits rotational power therebetween. When shifting shaft 104 is released for counterclockwise movement, coupling member 90 is displaced to the left as shown in FIG. 6. Because of the threaded engagement of groove 74 on hub 70 of spur gear 66 with spline 98 of coupling member 90, coupling member 90 will be arcuately displaced about its rotating axis in a direction shown by arrow 180 and of a magnitude dependent upon the pitch of the mating helical groove 74 and its respective spline 98. It follows, therefore, that because of the threaded engagement of spline 102 of coupling 90 with groove 86 of male member 82, male member 82 will also be arcuately displaced about its rotating axis a corresponding amount.

However, as groove 86 is in an opposite sense relative to groove 74, the lateral displacement of coupling member 90 will in itself arcuately displace male member 82 relative to coupling member 90 in a direction shown by arrow 182 and of a magnitude dependent upon the pitch of the mating helical groove 86 and its respective spline 102. Hence, axial displacement of coupling member 90 results in total arcuate displacement of male member 82 in a direction as shown by arrow 182 and of a magnitude dependent upon the pitch of mating helical grooves 74 and 84 with their respective splines 98 and 102.

While the above description has been given with specific reference to the mechanism for supply sprocket 12, it is to be understood that substantially the same mechanism is used with relation to take-up sprocket 20 with the one difference that there is a reversal in direction of the arcuate displacement thereof. Hence, the end result is that the rate of rotation of supply sprocket 12 is momentarily reduced whereas the rate of rotation of take-up sprocket 20 is momentarily increased, thus reducing the length of film between supply sprocket 12 and take-up sprocket 20. This causes the filmstrip to be displaced from engagement with the stationary guiding surfaces 44 and 48.

When the operator reverses the direction of filmstrip 14 through the projector, control knob 32 must first be moved through the neutral position (N) to the reverse (R) position. Accordingly, control lever 128 will rotate cam 132 to engage and pivot cam follower 122 about the axis of shifting shaft 104, thereby causing shaft 104 to rotate in a clockwise direction. Thus, the rotation of shaft 104 will laterally displace coupling members 88 and 90 to the right, as viewed in FIG. 2, relative to spur gears 62 and 66 and male members 80 and 82, as well as rotating plate 144 about the axis of shaft 104. This movement of the coupling members 88 and 90 would rotate sprockets 12 and 20 in a direction to enlarge the length of filmstrip 14 between sprockets 12 and 20 so that the loops 52 and 54 would be moved into engagement with loop formers 38 and 40. However, as the presence of filmstrip 14 on take-up sprocket 20 prevents the combined trigger-and-latch mechanism 152 from pivoting clockwise into the path of plate 144 the movement of control handle 32 to the reverse (R) position rotates cam 132 about its axis so that shifting shaft 104 again is free to rotate counterclockwise under the force of spring 124 to laterally displace coupling members 88 and 90 in the opposite direction and again free the film loops from the loop formers 38 and 40. In this manner, the desired loops 52 and 54 are formed regardless of whether the projector is in the forward (F) or reverse (R) condition.

Although the invention has been herein described with particular reference to sprockets 12 and 20 being rotated in a counterclockwise direction, respectively, to form loops 52 and 54, it has been found in actual practice that only the supply sprocket 12 need be rotated in the manner described above to form the free loop 52.

Figure 7:
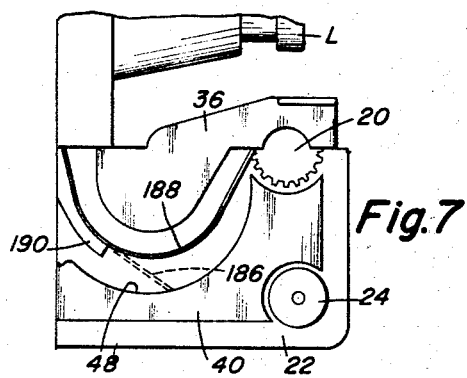
FIG. 7 is a partial side elevation view of the stationary lower loop former when only the upper film sprocket is equipped with the loop-adjusting mechanism as shown in FIG. 2.

In this embodiment, as shown in FIG. 7, a protuberance 190 formed adjacent the exit of the gate and in the normal path of filmstrip 14, intercepts the path of the leader end of filmstrip 14 and directs the filmstrip into a path substantially as shown by numeral 186, which path causes the film to engage substantially the midpoint of stationary curved surface 48. Under the impetus of the two-way pulldown mechanism feeding filmstrip 14 from the gate, the leader end of filmstrip 14 slides on surface 48 until the perforations therein are threaded onto the teeth of take-up sprocket 20 to thence form loop 188. Once threaded the rotational direction of take-up sprocket 20 normally shortens the loop 188 of filmstrip 14 a sufficient amount such that the filmstrip 14 will not normally slide along the inner surface 48 of the lower loop guide 40 when the projector is in its operative condition.

The structure of the automatic loop-forming system disclosed herein has the further advantage of restoring the film loops to their proper operative size when there is a loss of the lower loop due to stripped perforations in the film passing through the pulldown mechanism. Generally, when the loss of lower film loop occurs by reason of film perforations being stripped out, the radius of curvature of lower loop 54 is decreased so that filmstrip 14 of the lower loop slides off the surface of lower loop guide 40; whereas, the radius of curvature of the upper loop 52 is increased so as to engage surface 44 of loop guide 38. Actuation of control handle 32 to the neutral position will oscillate the sprockets 12 and 20 slightly and thereby advance the film relative to the claw mechanism of the projector. The film will slide over the two-way claw mechanism 46 and make the configuration it would have in a normal threaded operation. Upon moving the control handle 32 to the forward (F) or reverse (R) position, as desired, free loops 52 and 54 are once again formed in the filmstrip 14 and the projector is then in its desired operative position.

While the embodiment of the invention shown and described herein has been particularly described relative to a projector, it is to be understood that the inventive idea can be carried out in other motion-picture apparatus in which the formation or adjusting of loops is desired. This application is, therefore, not to be limited to the precise details described but is intended to cover all variations and modifications falling within the scope of the appended claims.

We claim:

1. An automatic film-threading mechanism for motion picture apparatus which includes a film advancing means mounted on a shaft and adapted to move a film, a driving means including a shaft substantially coaxially arranged relative to said shaft of said advancing means for normally driving said shaft of said advancing means to move a unit length of said film in a given period of time, a film feeding means located after said advancing means, and coupled to said driving means for intermittently advancing past a projection aperture the same unit length of film in a given period of time that is moved by said advancing means, the combination comprising:
   (a) loop-forming means located intermediate said film feeding means and said film advancing means during threading of the apparatus for guiding the film in a curved path as it travels successively from said advancing means, to said film feeding means;
   (b) means concentrically arranged relative to said drive shaft of said driving means and said shaft of said advancing means and movable from a normal position to an operative position for momentarily reducing the rotational speed of said advancing means relative to said driving means to shorten the length of film beteen said advancing means and said film feeding means.

2. In motion picture apparatus including a film gate through which a filmstrip is adapted to be intermittently advanced, first and second driven shafts, and a film feeding sprocket secured to each of said shafts to feed a filmstrip into and out of said gate, the combination comprising:
   (a) means for driving said shafts in synchronism including a pair of shiftable couplings connecting each each of said shafts to a prime mover and each shiftable axially of said shafts to momentarily interrupt the synchronism of the sprockets independently of said prime mover;
   (b) first and second loop-forming guides located intermediate said gate and said first and second sprockets, respectively, into engagement with which the filmstrip is fed during threading of the apparatus to form a film loop between said gate and each of said sprockets;
   (c) a pivoted trigger member operatively cooperating with said second sprocket and movable from a first position to a second position in response to the presence of said filmstrip engaging said second sprocket;
(d) a shifting shaft connected to said couplings to shift the same and biased to move to a loop forming position to shift the couplings in a direction to change the rate of rotation of said sprockets in directions to shorten the length of film therebetween;
(e) an abutment member connected to said shifting shaft and movable to an operative position for engaging said trigger member when it is in said first position;
(f) means connected to said shifting shaft for biasing said abutment member into said operative position;
(g) means associated with each of said couplings for imparting the change of rate of rotation to said driven shafts independently of said drive shaft as the couplings are shifted relative thereto; and
(h) means operatively connected between said shifting shaft and each of said couplings to shift said couplings when said trigger is moved to said second position to change the rate of rotation of each of said driven shafts and the sprockets connected thereto independently of said prime mover in a direction to reduce the length of filmstrip between each of said sprockets to displace the film strip out of contact with said loop formers.

3. In motion picture apparatus including a film gate in which in a neutral position of the apparatus a filmstrip can be halted and through which in the forward and reverse operation of the apparatus a filmstrip is adapted to be intermittently advanced, the combination comprising:
(a) first and second driven shafts;
(b) first and second driven film feeding sprockets secured to said first and second driven shafts, respectively, to feed a filmstrip into and out of said gate;
(c) means for selectively driving said shafts in synchronism in the forward and reverse directions for feeding a filmstrip to and from the gate including a drive member for each shaft;
(d) a shiftable coupling positively connecting each of said driven shafts to its respective drive member and shiftable axially of said shafts to and from a loop-forming position;
(e) means connecting said shiftable coupling to said driving and driven shafts to change the rate of rotation of said driven shafts independently of said drive members as said shiftable coupling is moved to said loop-forming position and including a helical spline connection between each of said couplings and its respective driving and driven shafts;
(f) first and second loop-forming guides located intermediate each sprocket and said gate into engagement with which the filmstrip is fed during threading of the apparatus to form a film loop between said gate and each of said sprockets;
(g) a pivoted trigger member operatively cooperating with said second sprocket and movable between a first position and a second position;
(h) a shifting shaft connected to said couplings to a loop-forming position, and including;
(i) a cam and cam follower means for limiting the movement of said shifting shaft in the forward and reverse operation of said filmstrip to move said couplings to a loop forming position when said film feeding sprockets are driven and for positively displacing said shifting shaft in the neutral position to move said couplings from a loop-forming position;
(j) an abutment member connected to said shifting shaft and radially spaced from the axis of rotation thereof and movable to an operative position wherein it engages said trigger member when it is in said first position; and said trigger member movable to the second position upon sensing the presence of film on said second sprocket whereby said shifting shaft is freed to move in said biased direction to axially shift each of said couplings to said loop-forming position and reduce the size of the loops of the filmstrip connecting each of said sprockets with said gate to free each of said loops from engagement with each of said loop guides.

4. In motion picture apparatus including a film gate through which a filmstrip is adapted to be intermittently advanced, the combination comprising:
(a) first and second driven shafts;
(b) first and second film feeding sprockets secured to first and second driven shafts, respectively, to feed a filmstrip into and out of said gate;
(c) means for driving said shafts in synchronism including a prime mover and a pair of shiftable couplings connecting each of said shafts to said prime mover and each shiftable axially of said shafts to change the rate of rotation of the sprockets independently of said prime mover;
(d) means located intermediate each sprocket and said gate into engagement with which the filmstrip is fed during threading of the apparatus to form a film loop between each of said sprockets and said gate;
(e) a shifting shaft operatively connected to said couplings and movable in one direction to a loop-forming position for momentarily interrupting the synchronism of said first and second driven shafts independently of said prime mover;
(f) a pivoted trigger member movable from a first position to a second position in response to the presence of said filmstrip engaging said second sprocket; and
(g) an abutment member formed with an upwardly extending portion having a side edge and a canted upper edge connected to said shifting shaft and radially displaced from the axis thereof, said side edge of said abutment member cooperating with said trigger member in the first position for preventing movement of said shifting member in said one direction and said upper edge cooperating with said trigger member when it is moved to the second position to further pivot the trigger member when said shifting shaft is released for movement in said one direction whereby said trigger member is spaced from and retained by said upper edge of said abutment member out of the path of the film passing over said second sprocket to prevent the trigger member from interfering with the free passage of said film.

References Cited
UNITED STATES PATENTS

| | | | |
|---|---|---|---|
| 1,309,990 | 7/1919 | Uebelmesser | 88—17 |
| 1,714,461 | 5/1929 | Chanier et al. | 88—18 |
| 2,448,292 | 8/1948 | Barber | 74—395 |
| 3,049,276 | 8/1962 | Wilkins | 226—111 |

M. HENSON WOOD, JR., *Primary Examiner.*

JOSEPH R. STRIZAK, RAPHAEL M. LUPO, *Examiners.*

C. J. BORUM, R. YOST, R. A. SCHACHER,
*Assistant Examiners.*